:::: {.columns}

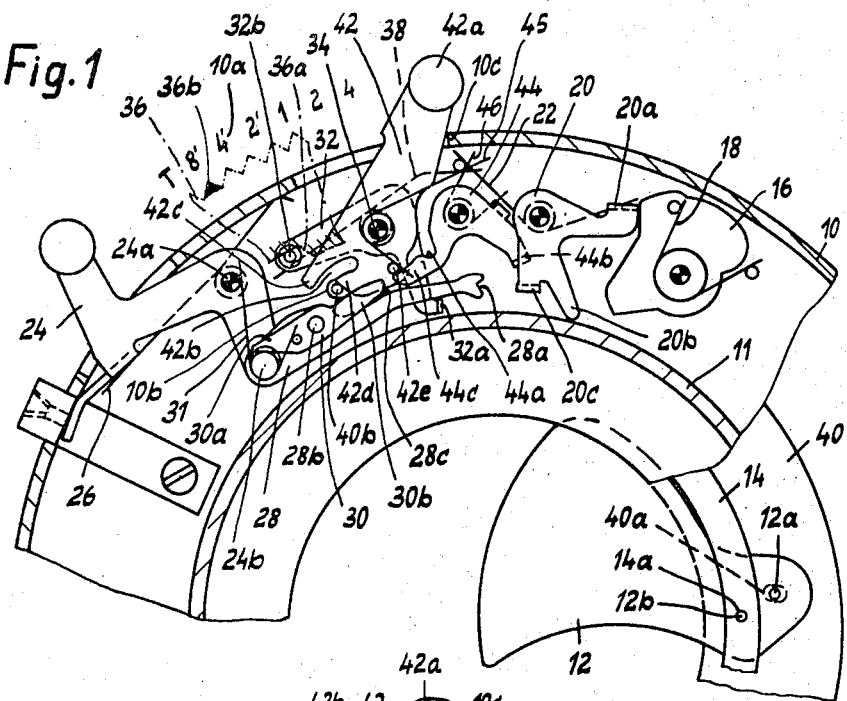
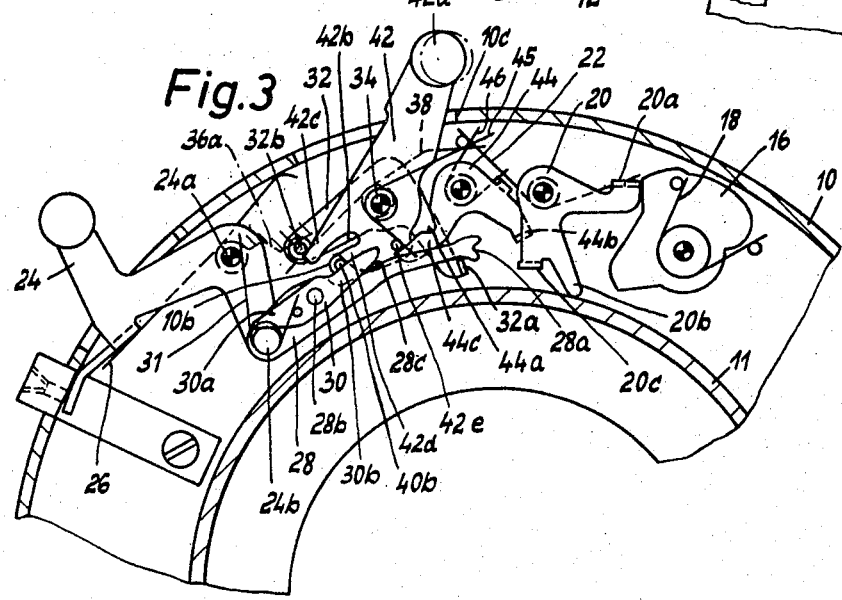

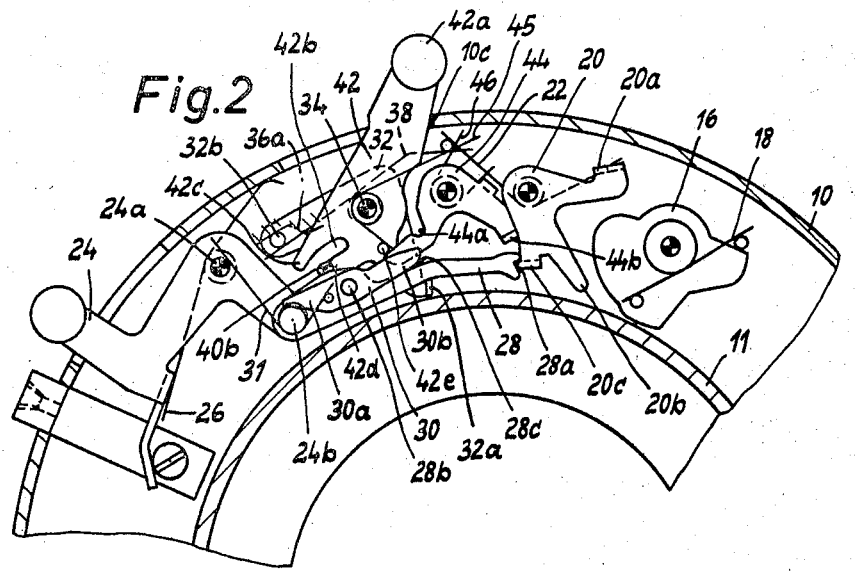
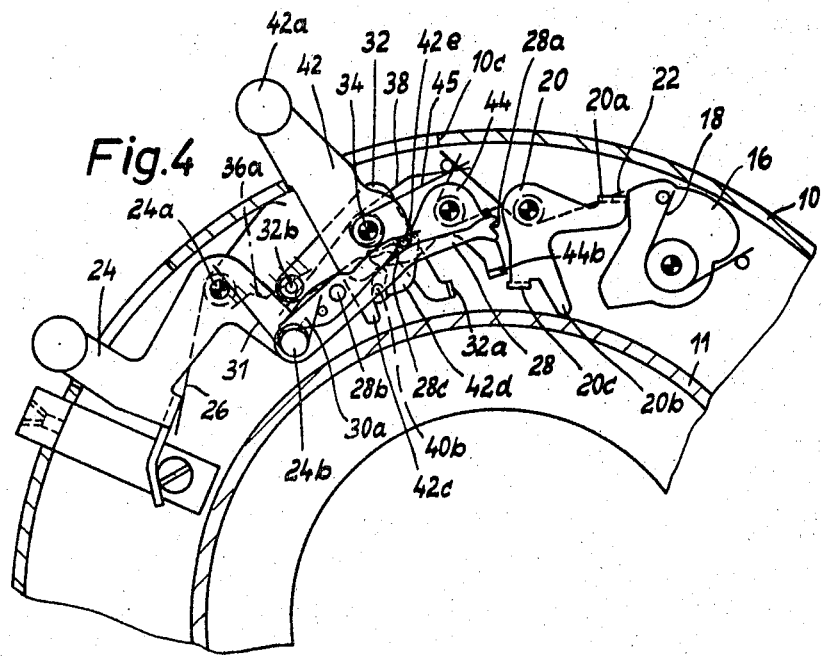

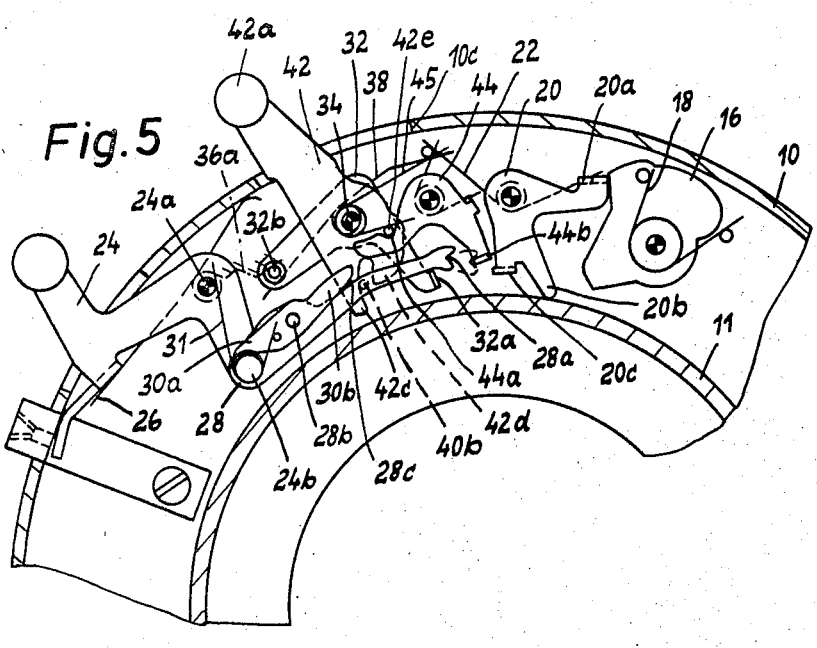

United States Patent Office 3,421,426
Patented Jan. 14, 1969

3,421,426
PHOTOGRAPHIC SHUTTER
Franz Singer, Munich, Germany, assignor to Compur-Werk, Gesellschaft mit beschränkter Haftung & Co.
Filed Sept. 23, 1965, Ser. No. 489,672
Claims priority, application Germany, Nov. 19, 1964, C 12,445
U.S. Cl. 95—63            3 Claims
Int. Cl. G03b 9/14

ABSTRACT OF THE DISCLOSURE

A photographic shutter has a main driving member capable of being tensioned, a locking lever for holding the driving member in tensioned position, means for tensioning the driving member, a speed setting ring selectively settable to positions for controlling any one of a series of internally timed exposures or a position for controlling an externally timed "T" exposure, a trip lever, and an opening lever for opening the shutter blades for inspection of the image. The opening lever is manually operable at all times, independently of any film feeding operation and independently of any tensioning operation and regardless of whether the main driving member is in tensioned or untensioned position. The opening lever is spring-biased to blade-closed position, and a ratchet or latch lever resiliently holds it in blade-open position. The lever is so shaped that it occupies one position when the opening lever is in blade-closed position and a second position when the opening lever is in blade-open position. Pivoted to the trip lever is a slide member guided by a control lever whose position is determined by the position in which the speed setting ring is set. If the trip lever is actuated while the speed setting ring is set for an internally timed exposure and while the opening lever is in blade-open position, the free end of the slide member will engage the latch lever, now in its second position, and release it so that the opening lever will return to blade-closed position under its spring power; then upon a second actuation of the trip lever, the same free end of the slide member will clear the latch lever, now in its first position, and engage the locking lever to release the holding action thereof and permit the main driving member to make an internally timed exposure. If the trip lever is actuated while the speed setting ring is set for a "T" exposure and while the blades are closed, the slide member now moves through a different path of travel because of the different position of the control lever, and its free end does not engage the locking lever, but instead, the slide member in combination with a driving lever pivoted thereon forms a jaw which engages the opening lever and moves it to its latched blade-open position. The blades may then be closed either by direct manual actuation of the opening lever to blade-closed position, or by a second actuation of the trip lever, which will now move the slide member so that its free end will engage the latch lever to release it and allow the opening lever to return to blade-closed position under its spring power.

---

The present construction is an improvement upon and refinement of the construction disclosed in Patent 3,283,-686, granted Nov. 8, 1966, for a joint invention of the present applicant and Herbert Benninger.

This invention relates to a photographic shutter with a main driving member for actuating the shutter blades for opening and closing movement for the purpose of making an exposure, a trip member which release the main driving member for a rundown movement from a cocked position, and an opening member which is adapted to be used to actuate the shutter blades for an opening and closing movement for the purpose of interim inspection of the image.

It is the object of the present invention to avoid the faulty exposures which may result from mistaken operation of the shutter control parts, and to this end to arrange the opening device which caters for interim inspection, and the T-arrangement, in such a way that in a T-setting position of the shutter the shutter blades can be operated, i.e. opened and/or closed alternatively by the trip member or by the opening member. This object is met in the present invention by a slide member which is pivotally connected at one end to a trip member and is guided in the vicinity of its other end by means of a control lug on a control lever adjustable by the exposure time setter of the shutter, and by a driving member which is disposed on the slide member and is adapted to engage a projection on the opening member, together with a ratchet lever which retains the opening member when the blades are in the open position, the end part of the slide member guided by the control lug having an operative surface which during the operation of the trip member in the case of instantaneous setting of the control lever is adapted to be brought into engagement with a locking lever which holds the main driving member in a cocked condition, or, in the case of a T-setting of the control lever, with a nose on the ratchet lever holding the opening member.

Advantageously, in accordance with a further feature of the invention, the driving member is in the form of a double-armed lever which is mounted by pin means on the slide member and has its first arm held under the effect of a torsion spring against the pivot pin which connects the slide member to the trip member, whilst its other arm cooperates with the projection on the opening member.

It is further of advantage, in accordance with a further feature of the invention, to make the arrangement such that the torsion spring is disposed around the pivot pin, bears at one end against a fixture and with its other end engages the first arm of the said lever, whereby the torsion spring biasses the lever into engagement with the pivot pin and also the slide member into engagement with the control lug.

The embodiment of the invention is explained in more detail in the accompanying description, this referring to the accompanying drawings. In these drawings:

FIG. 1 is a shutter seen in elevation and partly in section, and

FIGS. 2 to 5 are similar views of the shutter, but with the parts shown in various working positions.

The shutter illustrated is basically a known type of bladed shutter, the mechanisms of which are installed in a ring-shaped shutter housing 10. It has, for example, five shutter blades 12, one only of which has been illustrated for the sake of simplicity in FIG. 1; each blade is equipped with a pin 12a and a pin 12b. Each pin 12b positively engages in an opening 14a in a blade driving ring 14, this enabling the blade to be operated so as to open and close the objective aperture as a result of reciprocatory movement of the ring 14. The blade driving ring is, in turn, driven in known fashion by a main driving member 16. For example the engagement between the parts 16 and 14 may be provided in the manner shown in the Patent No. 2,785,612. Associated with the main driving member is a driving spring 18 which urges the same in the counter clockwise direction. In the cocked position shown in FIG. 1 the main driving member is held by an arm 20a of a three-armed locking lever 20. A spring 22 biasses this locking lever in the clockwise direction and its abutment arm 20b against the inner lens tube 11 of the shutter housing 10. The rear-

::::

wardly-angled third arm 20c of this locking lever 20 cooperates with a slide member 28 in a manner which will be described in more detail later.

Mounted rotatably about a fixed pin 24a is a trip lever 24 which is biassed in the clockwise direction by a torsion spring 26. One end of the slide member 28 is pivotally mounted on a pin 24b on the trip lever, and its other end is formed as a fork 28a. In turn, mounted pivotally on a pin 28b on the slide member 28 is a double-armed driving lever 30. A common coupling spring 31 is associated with the parts 28 and 30 and this urges the slide member 28 in the clockwise direction and the driving lever 30 in the counter clockwise direction. One arm 30a of the driving lever 30 engages the pivot pin 24b, whilst its other arm 30b constitutes with a slide member 28 a driving jaw 28c. The side face of the slide member 28 positively bears against the control lug 32a of a control lever 32. This latter is rotatably mounted on a pin 34, fixed in the housing, and also has a control pin 32b engaging a stepped control cam 36a on a time setting ring 36 rotatably mounted on the front side of the shutter housing 10. A torsion spring 38 biasses the control lever 32 in the clockwise direction. The manually-adjustable time setting ring 36 has a mark 36b which can be set relatively to a time scale 28a provided at the periphery of the shutter housing 10, as schematically shown in FIG. 1.

To enable the shutter to be opened during focusing, to provide an interim inspection of the image, a further ring 40 is provided alongside the blade driving ring 14, and this has a number of control slots 40a with which the pins 12a of the blades 12 engage. For this reason the ring 40 will hereinafter be referred to as the blade positioning ring. The blades 12 can be pivoted about the pins 12b for opening the light aperture to provide interim inspection, by moving the blade positioning ring 40 in the clockwise direction, and will be closed again in the counter clockwise direction when the ring 40 is returned. The blade positioning ring 40 has a forwardly projecting pin 40b which passes through a limiting arcuate slot 10b in the base plate of the shutter housing 10.

A double-armed opening lever 42 is rotatably mounted on the pin 34 coaxially above the control lever 32 and has a hand piece 42a which projects from the housing of the shutter. A return spring 45 strives to retain the opening lever in its rest position, this being determined by the abutment of its hand piece 42a against an edge 10c of the shutter housing 10. The opening lever is formed, at the part thereof disposed within the shutter, with a driving slot 42b defined by two radial driving arms 42c and 42d. The arm 42d is so constituted as to be disposed in front of the pin 40b of the blade positioning ring 40, in the rest position of said ring according to FIG. 1, thereby to preclude the same from moving. Moreover the opening lever 42 has a pin 42e adapted to be engaged with the detent notches 44a of a ratchet lever 44. This lever 44 is rotatably mounted between the locking lever 20 and the opening lever 42 and is biassed in the clockwise direction by a spring 46. Its arm 44c bears against the pin 42e of the opening lever 42, whilst its other, cranked arm 44b is adapted to cooperate with a fork 28a of the slide member 28.

The shutter described works as follows:

The shutter, as shown in FIGS. 1 and 2, is set to an exposure period of, for example, 8 seconds, which is automatically regulated by the shutter delay mechanism, and is cocked. When the user proceeds to take the photograph a trip lever 24 must be moved in the counterclockwise direction and against the action of the torsion spring 26. As a result of this movement the slide member 28 and the driving lever 30 are moved to the right, and in so doing it moves along the control lug 32a until its fork 28a engages the arm 20c. In response to further movement of the trip lever 24 in the same direction, the slide member 28 moves further to the right, as a result of which the locking lever 20 is pivoted in the counterclockwise direction and its arm 20a releases the main driving member 16 to allow it to run down. In fact it runs under the action of the driving spring 18 in the counter clockwise direction towards the rest position (FIG. 2). During this rundown movement the blade driving ring 14 is obliged by known means (not shown) to execute a reciprocatory motion (first in counter clockwise direction and then in clockwise direction), as a result of which the blades 12 are operated so as to open and close the objective aperture. Hereby the pins 12a of the blades 12 slide in the slots 40a of the ring 40 which is immovable in its rest position.

After the trip lever 24 is liberated it resumes its starting position (see FIG. 1), along with the slide member 28 and the driving lever 30, under the action of the return spring 26.

When the shutter is re-cocked, the main driving member 16 is brought from the run down position (FIG. 2) into its cocked position by a cocking lever (not shown) and held here by the arm 20a of the locking lever 20 (FIG. 1).

If it is desired to open the shutter for interim inspection, for example with the same time setting as in FIGS. 1 and 2, the opening lever 42 is turned by hand in the counter clockwise direction from the position seen in FIG. 1. In the first phase of this movement its arm 42d liberates the pin 40b. Shortly thereafter the arm 42c is applied against the liberated pin 40 and carries it along so that the blade positioning ring 40 is moved in the clockwise direction. During the further movement of the members 42, 40 the pin 40b is itself placed into the driving slot 42b and the ring 40 is carried in the clockwise direction along by the opening lever 42 until the shutter is fully opened. In this case the blades 12 move around the pins 14a of the ring 14 which is now immovable in its position. Shortly before the end of this phase of the movement, the detent device becomes operative insofar as the pin 42e engages the detent notch 44a and as a consequence the opening lever 42 is held in the blade-open position (similar to FIG. 5). In this motion the ratchet lever 44 is pivoted to a small degree in the clockwise direction by its spring, so that its arm 44b is disposed in the path of travel of the fork 28a of slide member 28. All the remaining parts of the shutter retain the positions illustrated in FIG. 1.

When the interim inspection has been concluded and the shutter is to be closed again before an actual photograph is taken, the following optional possibilities are afforded:

(a) A slight pressure in the clockwise direction on the hand piece 42a of the opening lever 42 in the position of FIG. 5 suffices to disengage the detent notch 44a from the pin 42e. The opening lever 42 then returns to the FIG. 1 position under the action of its return spring 45 whereby the ring 40 is moved back (in the counter clockwise direction) and the shutter blades 12 are closed. The ratchet lever 44 also resumes its FIG. 1 position.

(b) Alternatively the trip lever 24 may also be operated and turned in the counter clockwise direction. In this event the slide member 28, guided by the control lug 32a, moves to the right, its fork 28a engaging the arm 44b and turning the ratchet lever 44 in the counter clockwise direction. As a result of the positive engagement between the fork 28a and the arm 44b the slide member 28 is lifted away from the control lug 32a during the further pivoting of the ratchet lever 44 and carried past the arm 20c of the locking lever 20, which will prevent release of the shutter. During this pivotal motion of the ratchet lever 44 the detent engagement between the detent notch 44a and the pin 42e is also released, so that the opening lever 42 will turn under the action of the spring 45 into the rest position seen in FIG. 1. As a consequence the ring 40 is moved back (in the counter clockwise direction) and the shutter blades 12 are closed.

After the performance of operation (a) or (b) the shutter can now be tripped by actuating the trip lever 24 so as to take an exposure. The initiation of the closure procedure per (b) is of particular advantage when this takes place through a wire trip. By this means the shutter can be closed at the first pressure and tripped at the second.

If the user intends to take a photograph requiring an exposure time of more than 8 seconds it is not possible to use the delay mechanism of the shutter; a long exposure period of this character is implemented, in known fashion, through the T-arrangement of the shutter. For this purpose the time setting ring 36 is turned until its mark 36b registers with "T." As a result of this its step 36a engages the control pin 32b and the control lever 32 is turned, in the counter clockwise direction, during the rotary motion of the time setting ring 36, until its control pin 32b slides off the step 36a and is conducted by the next step into the position seen in FIGS. 3, 4 and 5. This changeover motion renders the delay mechanism of the shutter (previously mentioned but not illustrated) ineffective. During the pivotal movement of the control lever 32, referred to above, the opening lever 42 is slightly lifted through its arm 42c in the counter clockwise direction. At the same time the control lug 32a brings about a pivoting in the counter clockwise direction of the parts 28, 30 around the pin 24b (FIG. 3).

In the T-setting, the locking lever arm 20c is thus disposed outside the path of travel of fork 28a, whereby the main driving means 16, 18, become ineffective (irrespective of whether they are cocked or uncocked) and the shutter has to be opened and closed by hand.

In the case of the T-setting the opening of the shutter can be performed by the following optional methods:

(A) Either the opening lever 42 is moved in the counter clockwise direction, to bring about a pattern of movement as described above.

(B) Or the trip lever 24 is moved in the counter clockwise direction so that the slide member 28 and the driving lever 32 move to the right, the jaw 28c engages the pin 42e and moves the opening lever 42 and the blade positioning ring 40 into their FIG. 4 positions. The opening lever 42 is held in this position by the detent mechanism 42e, 44a. As a result of the interlinking between the jaw 28c and the pin 42e the slide member 28 is moved away from the control lug 32a during the displacement, whereby the fork 28a will slide idly over the arm 20c of the locking lever 20 (FIG. 4). After the trip lever 24 has been liberated, the parts 24, 28, 30 return to their starting positions, as in FIG. 5, under the action of the return spring 26, whilst the parts 40, 42 remain held in the blade-open position by the ratchet lever 44.

The closure of the shutter, opened at the T-setting, for terminating either the exposure or the interim inspection can, in turn, be optionally performed:

(AA) Either by returning the opening lever 42 in the clockwise direction, as described in more detail above under point (a).

(BB) Or by actuating the trip 24 as described in more detail under point (b) above but with the exception that during the operation of the trip lever 24 after release of the detent device 42e, 44a and ensuing restoration of the parts 24, 28, 30 to their rest position, the arm 30b contacts the pin 42e, which is held in its rest position, as a result of which the driving lever 30 performs a slight deflection in the clockwise direction against the force of spring 31. In the rest position the parts 24, 28, 30 resume their starting positions.

It is further to be noted that, if required, the parts 28, 30 may be made in one piece.

The features of the invention exposed above have the advantage that the opening and trip members can be selectively used or operated, and are therefore foolproof. Any confusion between the operating members 24 or 42, due to inattention can thus not produce a faulty exposure. Moreover the form of construction in accordance with the invention makes minimum demands on constructional parts and space, so that it can be used in connection with the shutter systems of both small and large diameters.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a main driving member operating the shutter blades for opening and closing movement for the purpose of making an exposure, a locking lever for holding the main driving member in a cocked position, a trip member for releasing said locking lever, an opening member for actuating the blades for an opening and closing movement for the purpose of interim inspection of the image, said opening member being manually operable at all times, independently of any shutter cocking operation and any film feeding operation, a slide member pivotally connected at one end to said trip member and guided, in the vicinity of its other end, by means of a control lug on a control lever adjustable by the exposure time setter of the shutter, a driving member disposed on the slide member and adapted to engage a projection on the opening member, and a ratchet lever retaining the opening member when the blades are in the open position, wherein the end part of the slide member guided by the control lug has an operative surface which during the operation of the trip member is adapted to be brought into engagement, in the case of instantaneous setting of the control lever, with said locking lever which holds the main driving member in a cocked condition, or, in the case of a T-setting of the control lever, with said ratchet lever holding the opening member in the open position of the shutter blades.

2. A photographic shutter according to claim 1, wherein the driving member is in the form of a double-armed lever mounted by pin means on the slide member and having its first arm held under the effect of a torsion spring against the pivot pin connecting the slide member to the trip member, whilst its other arm cooperates with the projection on the opening member.

3. A photographic shutter according to claim 2, wherein the torsion spring is disposed around the pivot pin, bears at one end against a fixture and with its other end engages the first arm of the said lever, whereby the torsion spring biasses the lever into engagement with the pivot pin and also the slide member into engagement with the control lug.

References Cited

UNITED STATES PATENTS

| 2,862,431 | 12/1958 | Noack | 95—42 X |
| 2,926,575 | 3/1960 | Gebele | 95—42 |
| 3,221,629 | 12/1965 | Renschler | 95—42 X |
| 3,122,081 | 2/1964 | Singer | 95—63 |
| 3,283,686 | 11/1966 | Singer | 95—63 |

JOHN M. HORAN, *Primary Examiner.*